US010367939B2

(12) United States Patent
Eades

(10) Patent No.: US 10,367,939 B2
(45) Date of Patent: *Jul. 30, 2019

(54) IVR RECORDING PREVIEW SYSTEM AND METHOD

(71) Applicant: Verint Americas Inc., Alpharetta, GA (US)

(72) Inventor: Neil Eades, Glasgow (GB)

(73) Assignee: Verint Americas Inc., Alpharetta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/977,721

(22) Filed: May 11, 2018

(65) Prior Publication Data
US 2018/0352086 A1    Dec. 6, 2018

Related U.S. Application Data

(63) Continuation of application No. 15/614,222, filed on Jun. 5, 2017, now Pat. No. 9,986,090.

(51) Int. Cl.
H04M 3/51    (2006.01)
H04M 3/42    (2006.01)
H04M 3/533    (2006.01)

(52) U.S. Cl.
CPC ..... H04M 3/5166 (2013.01); H04M 3/42221 (2013.01); H04M 3/5183 (2013.01); H04M 3/53358 (2013.01); H04M 2203/303 (2013.01)

(58) Field of Classification Search
CPC ......... H04M 2201/40; H04M 2201/18; H04M 3/2281; H04M 3/42221; H04M 3/53366; H04M 1/2475; H04M 1/7255; H04M 1/72591; H04M 2203/558; H04M 2203/6054; H04M 3/38; H04M 3/42059; H04M 3/42391; H04M 3/5183; H04M 3/385; H04M 3/51
USPC .................. 379/265.06, 265.12, 88.22, 88.18
See application file for complete search history.

(56) References Cited

U.S. PATENT DOCUMENTS

| 6,170,011 | B1* | 1/2001 | Macleod Beck | ...... G06Q 10/06 709/224 |
| 7,092,506 | B1* | 8/2006 | Bers | ..................... H04M 3/4936 379/265.02 |
| 8,503,647 | B2* | 8/2013 | Carter | ................. H04M 3/5183 379/201.01 |
| 2001/0025309 | A1* | 9/2001 | Macleod Beck | ... G06F 17/2765 709/223 |
| 2002/0196926 | A1* | 12/2002 | Johnson | ................ H04M 3/523 379/265.02 |
| 2007/0160054 | A1* | 7/2007 | Shaffer | ............... H04M 3/5175 370/395.2 |

(Continued)

Primary Examiner — Akelaw Teshale
(74) Attorney, Agent, or Firm — Christopher M. Scherer; DeWitt LLP

(57) ABSTRACT

The present system and method allow a customer service agent to preview an audio file of a customer's interaction with an interactive voice response (IVR) system before taking the call. While customer voice commands are typically used to navigate through an IVR system to reach an appropriate agent, the present system and method record the customer's voice commands in response to IVR prompts as an audio file and provide them to the agent before she or he takes the call. The agent may play the audio file on a customer engagement center desktop.

21 Claims, 3 Drawing Sheets

(56) References Cited

U.S. PATENT DOCUMENTS

2016/0065739 A1* 3/2016 Brimshan ........... H04M 3/5231
379/88.01

* cited by examiner

IVR RECORDING PREVIEW SYSTEM AND METHOD

CROSS-REFERENCE TO RELATED APPLICATIONS

The present application is a continuation of U.S. application Ser. No. 15/614,222, filed on Jun. 5, 2017, the content of which is incorporated herein by reference in its entirety.

FIELD

The present disclosure is directed to a centralized arrangement for answering telephone calls and particularly to system that allows a preview of a customer's response to an interactive voice response system.

BACKGROUND

Interactive voice response (IVR) systems allow a customer engagement center (CEC) to interact with customers through the use of either voice commands or dual-tone multi-frequency (DTMF) tone commands. The IVR system receives voice commands from a telephone receiver or microphone, while DTMF commands are entered through a physical or simulated keypad. CECs with high volumes of callers frequently use IVR systems to prescreen calls, provide customers with automated information or services, and/or direct them to specific customer service agents after receiving preliminary information from the customer. This reduces the call volumes to agents and provides agents with information on the customer before they connect to the telephone call, allowing more rapid and efficient customer service.

Unfortunately, some customers may find IVR systems difficult or annoying to use, resulting in the customer becoming hostile. Already-agitated customers may become more irritated by the impersonality of the IVR system or the time required to navigate to an agent. Without knowing a customer's current state of mind, an unprepared agent entering a telephone call may inadvertently offend the customer or otherwise escalate the antagonism of the telephone call. Failing to establish a prompt rapport with the client can lead to poor outcomes in terms of problem resolution and customer satisfaction.

There is an unmet need in the art for an IVR system capable of providing information on a customer's interactions with the IVR system to a customer service agent before the agent makes contact with the customer.

BRIEF SUMMARY

An exemplary embodiment of the present application is a method for previewing an IVR recording. At least one audio file is processed using an IVR unit to create routing data. The routing data is transferred to a routing unit that processes the routing data to create customer data. The method then routes the telephone call to a queue for a customer service agent based on the customer data and prompts the customer service agent to play the at least one audio file on a CEC desktop before connecting the customer service agent to the telephone call.

Another exemplary embodiment of the present application is a system for previewing an IVR recording. The system includes a processor that receives audio data from a telephone call and creates at least one audio file from the audio data. The system also includes a non-transient computer readable medium operatively connected to the processor and programmed with computer readable code that upon execution by the processor causes the processor to execute the above-mentioned method for previewing an IVR recording.

Another exemplary embodiment of the present application is a non-transient computer readable medium programmed with computer readable code that upon execution by a processor causes the processor to execute the above-mentioned method for previewing an IVR recording.

The objects and advantages will appear more fully from the following detailed description made in conjunction with the accompanying drawings.

DETAILED DESCRIPTION

In the present description, certain terms have been used for brevity, clearness and understanding. No unnecessary limitations are to be applied therefrom beyond the requirement of the prior art because such terms are used for descriptive purposes only and are intended to be broadly construed. The different systems and methods described herein may be used alone or in combination with other systems and methods. Various equivalents, alternatives and modifications are possible within the scope of the appended claims. Each limitation in the appended claims is intended to invoke interpretation under 35 U.S.C. § 112, sixth paragraph, only if the terms "means for" or "step for" are explicitly recited in the respective limitation.

Customer engagement center (CEC) systems allow customer service agents to engage with customers in a controlled, informed manner. Interactive voice response (IVR) systems allow a CEC system to interact with customers through the use of either voice commands or dual-tone multi-frequency (DTMF) tone commands in response to audible prompts generated by the IVR system. IVR systems are designed to streamline customer interaction with agents by using responses to prompts to gather information from the customer and guide customers to an appropriate agent. In the absence of IVR systems, additional agents must guide customers to the correct agent or must enter a call knowing nothing about the customer. Additional agents incur additional costs, while "blind" calls may cause delays in resolving the customer's call.

In embodiments, it is desirable to allow an agent to review an audio file of the customer's interaction with the IVR system before connecting to the customer's call. Review of this audio file allows an agent to gauge the customer's mood and determine what services the agent might need to offer. In an embodiment, it is desirable to allow an agent to review an audio file containing only the customer's responses to prompts. In an embodiment, it is desirable to allow an agent to review an audio file containing the audible prompts from the IVR system as well as the customer's responses. In an embodiment, it is desirable to allow an agent to avoid review if they feel it is unnecessary.

While some IVR systems may flag certain terms, such as obscenities, or flag customers speaking very loudly, these do not provide sufficient understanding of the customer's attitude to be useful. As described in further detail herein, the present system and method can provide a full audio file of the customer's entire interaction with the IVR system.

Figure 1:
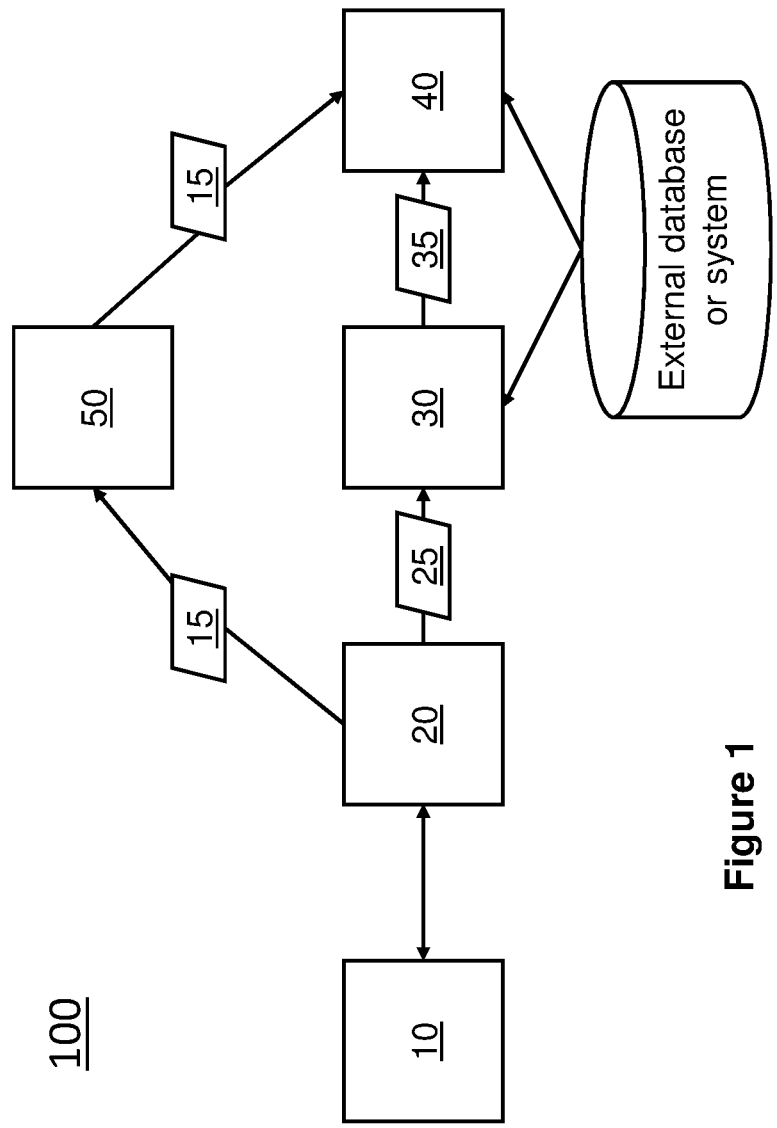
FIG. 1 is a flowchart depicting an exemplary embodiment of a CEC system for making an IVR recording and facilitating interaction between a customer and a customer service agent.

FIG. 1 is a flowchart that depicts an exemplary embodiment of CEC system 100 for making an IVR recording and facilitating interaction between a customer (not shown) and a customer service agent (not shown).

When a customer calls in to CEC system 100 on a telephone 10, their call automatically connects to IVR unit 20. It should be understood that the term "telephone" may encompass any apparatus connected to a public switched telephone network or to a voice over IP network. The IVR unit 20 is configured to transmit audible prompts to the customer through telephone 10 and to receive voice commands and/or DTMF tone commands from the customer through telephone 10. The IVR unit 20 may be configured to transmit audible prompts for customer identification information, customer account numbers, transaction numbers, security verification information, subjects of interest to the customer, the customer's reason for calling, or any other information that may prove useful in identifying and routing a customer's call. By way of non-limiting example, if a customer called into a bank's CEC system 100, IVR unit 20 might transmit an audible prompt for the customer to provide an account number by speaking the account number into telephone 10 or by entering the account number into the keypad of telephone 10.

The IVR unit 20 transforms the audio data transmissions between telephone 10 and IVR unit 20 into an audio file 15. It should be understood that audio file 15 may not be a single discrete file, but may be a real-time or near-real time stream, or a series of packets. Audio file 15 may be created from audio data including both the audible IVR prompts and the customer response, or the audio data source may be the customer voice responses only. If audio file 15 includes any customer responses other than DTMF tone commands, audio file 15 may be transmitted and/or saved to an audio database 50.

Still referring to FIG. 1, IVR unit 20 processes audio file 15 to create routing data 25. In one embodiment, IVR unit 20 processes voice commands in audio file 15 using speech recognition software. In one embodiment, the customer immediately passes to an agent if IVR unit 20 is unable to process voice commands in audio file 15 and has insufficient DTMF tone commands for other routing. By way of non-limiting example, speech impediments, heavy accents, low voice volume, or interference may make it impossible for IVR unit 20 to process voice commands in audio file 15. The IVR unit 20 transmits routing data 25 to routing unit 30.

Routing unit 30 is configured to assign the customer to a particular agent or agent group based on the information contained in routing data 25. Routing unit 30 may also receive optional data received from a separate system or database. By way of non-limiting example, if a customer called into a utility provider's CEC system 100 and provided a business account number to IVR unit 20, routing unit 30 would route them to a commercial accounts agent. By way of another non-limiting example, if a customer called into a bank's CEC system 100 and provided a home mortgage number to IVR unit 20, and a customer payment database noted that the latest payment was overdue, routing unit 30 would route them to an agent specializing in personal payment plans. Based on the information contained in routing data 25 or optional databases, routing unit 30 may also flag the customer when assigning them to an agent or agent group. By way of non-limiting example, if a customer failed to provide correct answers to security prompts or their account had a recent history of fraudulent access attempts, the agent may receive an alert of potential fraud.

Routing unit 30 processes the routing data 25 and optional data to create customer data 35. Routing unit 30 transmits customer data 35 to a CEC desktop 40 for viewing, allowing a customer service agent to review customer data 35 before receiving the telephone call. Customer data 35 may include data obtained during the current telephone call and optionally other information received from a separate system or database.

The CEC desktop 40 allows the agent to review customer data 35, audio files 15 for current and previous calls, customer information from any other systems or databases, and any flags or security alerts for current or previous calls. By way of non-limiting example, an agent may review audio file 15 to determine if the customer has a hostile or confrontational tone and adjust their initial interactions accordingly. By way of another non-limiting example, if a call has a security flag, the agent may review previous, unflagged calls to familiarize themselves with the customer's voice.

Figure 2:
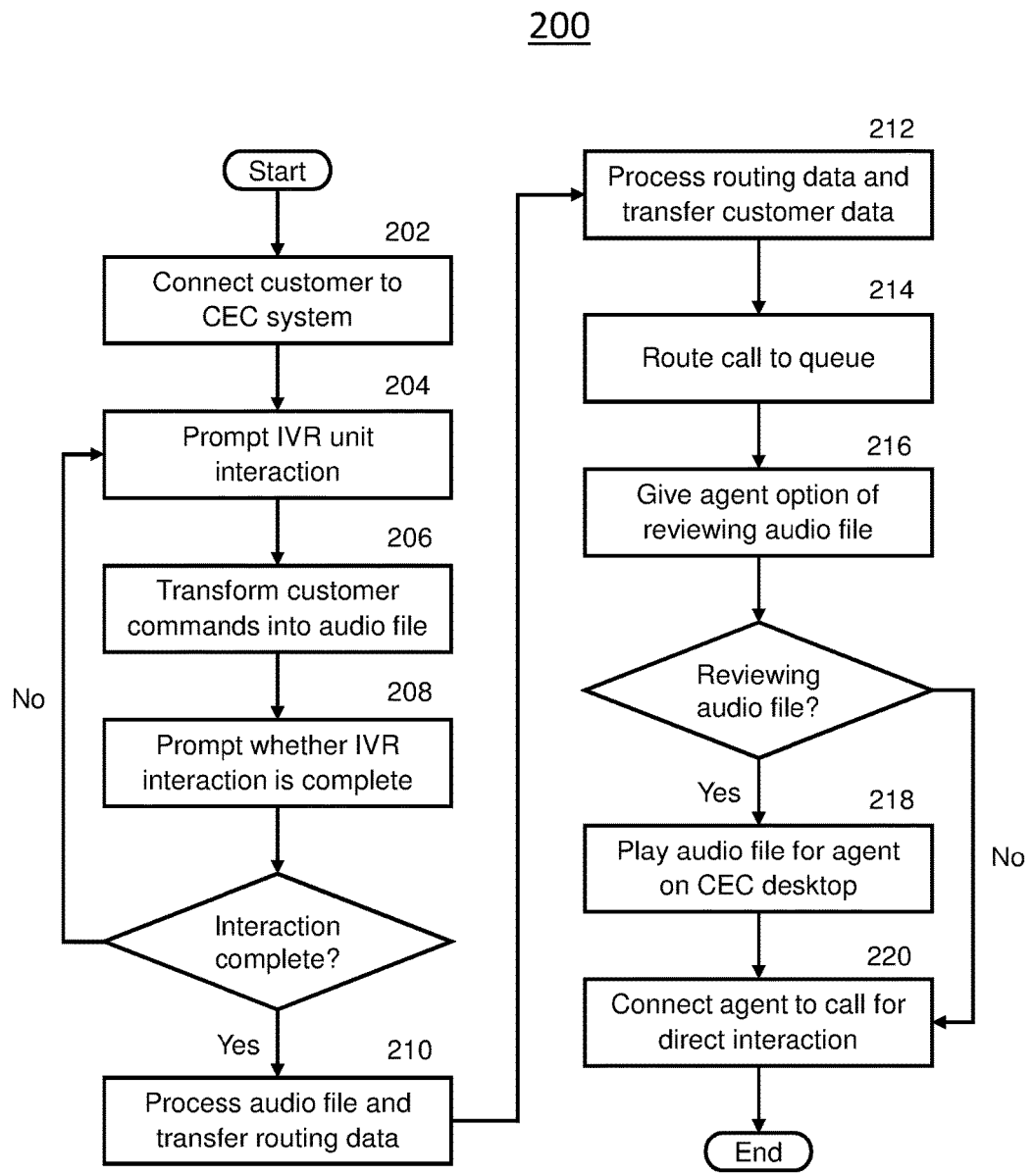
FIG. 2 is a flowchart depicting an exemplary embodiment of a method for previewing an IVR recording.

FIG. 2 is a flowchart that depicts an exemplary embodiment of a method 200 for previewing an IVR recording.

Referring to both FIG. 1 and FIG. 2, in step 202, a customer calls in to CEC system 100 using a telephone. In various embodiments, the customer may elect to connect to IVR unit 20 or may connect to IVR unit 20 automatically.

In step 204, IVR unit 20 prompts interaction with the customer by transmitting at least one preselected audible prompt. The customer may respond by using voice commands and/or DTMF tone commands. In various embodiments, IVR unit 20 may transmit prompts according to a preprogrammed script, may base the prompt transmitted on at least one customer received response, or some combination of both. In certain situations, a customer may choose to interact with IVR unit 20 using both voice and DTMF commands. By way of non-limiting example, a customer in a public location may choose to enter their account number and Social Security number using DTMF for security, but say "Disputed Transactions" when IVR unit 20 prompts them for the purpose of their call. In certain embodiments, IVR unit 20 is configured to flag certain speech markers, such as, but not limited to, speech that IVR unit 20 cannot process, high customer voice volume, obscenities, or requests for an agent.

In step 206, IVR unit 20 transforms any customer voice commands and DTMF tone commands received from step 204 into at least one audio file 15. Audio file 15 may also incorporate the audible prompts from IVR unit 20. This step may take place concurrently with step 204 in the case of streaming audio files 15.

In optional step 208, IVR unit 20 prompts the customer to respond whether the IVR interaction is complete. If the customer indicates that interaction is not complete, method 200 returns to step 204.

In step 210, CEC system 100 processes audio file 15 using IVR unit 20 to create routing data 25 and transfers routing data 25 to routing unit 30.

In step 212, CEC system 100 processes routing data 25 using routing unit 30 to create customer data 35 and transfers customer data 35 to CEC desktop 40. Optionally, step 212 may also process additional customer information received from a separate system or database when creating customer data 35.

In step 214, CEC system 100 routes the customer's call to a queue for an appropriate customer service agent based on customer data 35.

In step 216, the agent receives the option of reviewing any audio files 15 obtained from the current call or previous calls. If the agent elects to not review audio file 15, method 200 proceeds to step 220.

In step 218, CEC system 100 plays audio file 15 for the agent on CEC desktop 40. The agent may use CEC desktop 40 to skip or repeat portions of any audio files 15 played for the agent. The agent may also review customer data 35, audio files 15 for previous calls, customer information from any other systems, and any flags or security alerts for current or previous calls using CEC desktop 40.

In step 220, the agent connects to the customer's call and interacts directly with the customer. At this point, it is hoped that the agent has gained insight into the customer from review of customer data 35, audio files 15 for current or previous calls, customer information from any other systems, and any flags or security alerts for current or previous calls.

Figure 3:
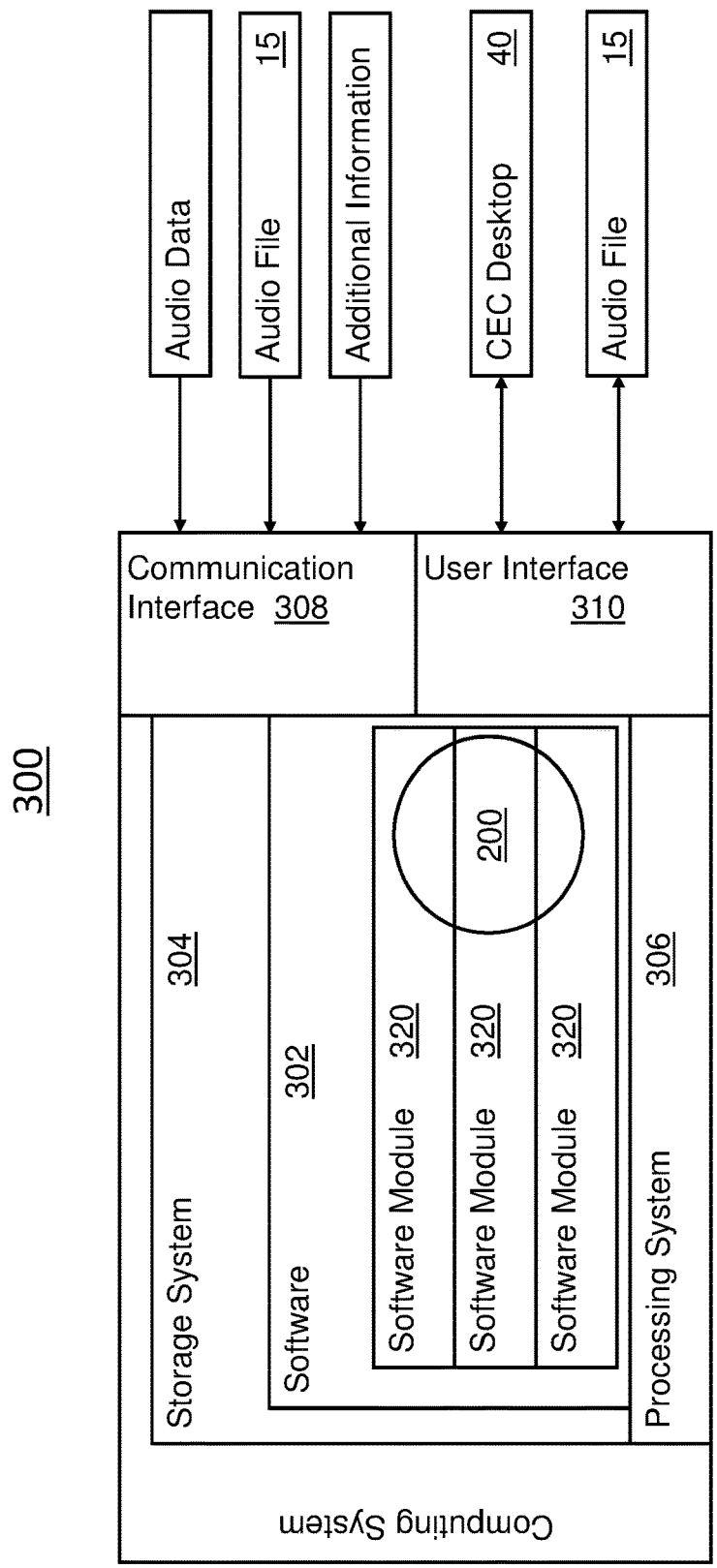
FIG. 3 is a system diagram of an exemplary embodiment of a system for previewing an IVR recording.

FIG. 3 is a system diagram of an exemplary embodiment of a computing system 300 for creating and previewing an IVR recording. Computing system 300 generally includes a processing system 306, storage system 304, software 302, communication interface 308 and a user interface 310. Processing system 306 loads and executes software 302 from storage system 304, including at least one software module 320. When executed, software modules 320 direct processing system 306 to operate as described herein in accordance with method 200.

Computing system 300 includes software modules 320 for performing the functions of IVR unit 20, routing unit 30, and/or CEC desktop 40. Although computing system 300 as depicted in FIG. 3 includes three software modules 320 in the present example, it should be understood that fewer or more software modules 320 could provide the same operation. Similarly, while description as provided herein refers to a computing system 300 and a processing system 306, it is to be recognized that implementations of such systems can be performed using different software modules 320 on multiple computing systems 300 and/or processing systems 306, which may be communicatively connected, and such implementations are considered to be within the scope of the description.

Communication interface 308 may send or receive data to or from other systems or external or remote databases. Such data may include customer information, raw audio data, or audio files 15.

Processing system 306 can comprise a microprocessor and other circuitry that retrieves and executes software 302 from storage system 304. Processing system 306 can be implemented within a single processing device but can also be distributed across multiple processing devices or sub-systems that cooperate in existing program instructions. Examples of processing system 306 include general purpose central processing units, application specific processors, and logic devices, as well as any other type of processing device, combinations of processing devices, or variations thereof.

Storage system 304 can comprise any storage media readable by processing system 306, and capable of storing software 302 and audio database 50. Storage system 304 can include volatile and non-volatile, removable and non-removable media implemented in any method or technology for storage of information, such as computer readable instructions, data structures, program modules, or other data. Storage system 304 can be implemented as a single storage device but may also be implemented across multiple storage devices or sub-systems. Storage system 304 can further include additional elements, such as a controller capable of communicating with processing system 306. Storage system 304 can store multiple audio files 15 as audio database 50.

Examples of storage media include random access memory, read only memory, magnetic discs, optical discs, flash memory, virtual memory, and non-virtual memory, magnetic sets, magnetic tape, magnetic disc storage or other magnetic storage devices, or any other medium that can be used to storage the desired information and that may be accessed by an instruction execution system, as well as any combination or variation thereof, or any other type of storage medium. In some implementations, the storage media can be a non-transitory storage media. In some implementations, at least a portion of the storage media may be transitory. It should be understood that in no case is the storage media a propagated signal.

User interface 310 can include a mouse, a keyboard, a voice input device, a touch input device for receiving a gesture from a user, a motion input device for detecting non-touch gestures and other motions by a user, and other comparable input devices and associated processing elements capable of receiving user input from a user. Output devices such as a video display or graphical display can display an interface, such as CEC desktop 40, further associated with embodiments of the system and method as disclosed herein. Speakers or personal listening devices can play audio files 15. Printers, haptic devices and other types of output devices may also be included in user interface 310.

As described in further detail herein, computing system 300 receives or generates at least one audio file 15. Audio file 15 may be an audio recording or a streamed conversation, which may exemplarily be between a speaker and the corresponding IVR system prompts or responses. Audio file 15 may also be any of a variety of other or additional audio records, including multiple speakers or one or more speakers without corresponding IVR prompts or responses. In an exemplary embodiment, audio file 15 is a .WAV file. In other embodiments, audio file 15 is another file format, such as, but not limited to, a pulse code modulation format. In still further embodiments, audio file 15 may be streaming audio data received in real time or near-real time by computing system 300. In these embodiments, computing system 300 would have to convert audio file 15 to a storable format.

Any version of any component or method step of the application may be used with any other component or method step of the application. The elements described herein can be used in any combination whether explicitly described or not.

As used herein, the singular forms "a," "an," and "the" include plural referents unless the content clearly dictates otherwise. Numerical ranges as used herein are intended to include every number and subset of numbers contained within that range, whether specifically disclosed or not. Further, these numerical ranges should be construed as providing support for a claim directed to any number or subset of numbers in that range. For example, a disclosure of from 1 to 10 should be construed as supporting a range of from 2 to 8, from 3 to 7, from 5 to 6, from 1 to 9, from 3.6 to 4.6, from 3.5 to 9.9, and so forth.

All patents, patent publications, and peer-reviewed publications (i.e., "references") cited herein are expressly incorporated by reference in their entirety to the same extent as if each individual reference were specifically and individually indicated as being incorporated by reference. In case of conflict between the present disclosure and the incorporated references, the present disclosure controls.

The devices, methods, compounds and compositions of the present application can comprise, consist of, or consist essentially of the essential elements and limitations described herein, as well as any additional or optional steps, ingredients, components, or limitations described herein or otherwise useful in the art.

While this invention may be embodied in many forms, what is described in detail herein is a specific preferred embodiment of the invention. The present disclosure is an exemplification of the principles of the invention is not intended to limit the invention to the particular embodiments illustrated. It is to be understood that this invention is not limited to the particular examples, process steps, and materials disclosed herein as such examples, process steps, and materials may vary somewhat. It is also understood that the terminology used herein is used for the purpose of describing particular embodiments only and is not intended to be limiting since the scope of the present invention will be limited to only the appended claims and equivalents thereof.

In the foregoing description, certain terms have been used for brevity, clearness, and understanding. No unnecessary limitations are to be inferred therefrom beyond the requirement of the prior art because such terms are used for descriptive purposes and are intended to be broadly construed. The different configurations, systems, and method steps described herein may be used alone or in combination with other configurations, systems and method steps. It is to be expected that various equivalents, alternatives and modifications are possible within the scope of the appended claims.

What is claimed is:

1. A method for previewing an interactive voice response (IVR) recording, comprising:
   processing at least one audio file using an IVR unit to create routing data, wherein the at least one audio file was obtained from an interaction between a customer and the IVR in a telephone call;
   transferring the routing data to a routing unit;
   processing the routing data using a routing unit to create customer data;
   routing the telephone call to a queue for a customer service agent based on the customer data;
   prompting the customer service agent to play the at least one audio file using a Customer Engagement Center (CEC) desktop;
   connecting the customer service agent to the telephone call.

2. The method of claim 1, wherein the at least one audio file is created by transmitting at least one preselected audible prompt from the IVR unit to a telephone during the telephone call, receiving at least one customer voice command in response to the at least one preselected audible prompt, and transforming the at least one customer voice command into the at least one audio file.

3. The method of claim 2, herein the at least one audio file includes all transmitted preselected audible prompts from the IRV unit and all customer voice commands received during the telephone call.

4. The method of claim 2, wherein the routing unit receives additional customer information from another system or database to create the customer data.

5. The method of claim 4, wherein the additional customer information is used to verify the accuracy of the customer responses to the audio prompts.

6. The method of claim 5, wherein the routing unit is configured to flag the at least one audio file when the customer responses to the audio prompts are not verified.

7. The method of claim 4, further comprising prompting the customer service agent to review the additional customer data from other systems using the CEC desktop.

8. The method of claim 4, wherein the additional customer information is previous calls associated with the customer.

9. The method of claim 4, wherein the additional customer information is flags from previous calls associated with the customer.

10. The method of claim 1, wherein the routing unit routes the telephone call to a queue for a next available customer service agent in the event the IVR unit is unable to process voice commands in the audio data or unable to process dual-tone multi-frequency (DTMF) tone commands.

11. The method of claim 1, further comprising the step of saving the at least one audio file and the customer data to an audio database.

12. A system for previewing an IVR recording, the system comprising:
   a processor that receives audio data from an interaction between a customer and an IVR in a telephone call and creates at least one audio file from the audio data;
   a non-transitory computer readable medium operatively connected to the processor and programmed with computer readable code that upon execution by the processor causes the processor to:
   process the at least one audio file using an IVR unit to create routing data;
   transfer the routing data to a routing unit;
   process the routing data using a routing unit to create customer data;
   route the telephone call to a queue for a customer service agent based on the customer data;
   prompt the customer service agent to play the at least one audio file using a Customer Engagement Center (CEC) desktop; and
   connect the customer service agent to the telephone call.

13. The system of claim 12, wherein the non-transient computer readable medium is programmed with computer readable code that upon execution by the processor causes the processor to transmit at least one preselected audible prompt from the IVR unit to a telephone during the telephone call, receive at least one customer voice command in response to the at least one preselected audible prompt, and transform the at least one customer voice command into the at least one audio file.

14. The system of claim 13, further comprising an audio database for storing audio files and customer data, wherein the non-transient computer readable medium is programmed with computer readable code that upon execution by the processor causes the processor to save the at least one audio file and the customer data to the audio database.

15. The system of claim 12, wherein the non-transient computer readable medium is programmed with computer readable code that upon execution by the processor causes the processor to route the telephone call to a queue for a next available customer service agent in the event the IVR unit is unable to process voice commands in the audio data or unable to process DTMF tone commands.

16. The system of claim 12, wherein the non-transient computer readable medium is programmed with computer readable code that upon execution by the processor causes the processor to prompt the customer service agent to review at least one additional data previously saved.

17. A non-transitory computer readable medium programmed with computer readable code that upon execution by a processor causes the processor to:
- process at least one audio file using an IVR unit to create routing data, wherein the audio the is created from an interaction between a customer and the IVR;
- transfer the routing data to a routing unit;
- process the routing data using a routing unit to create customer data;
- route the telephone call to a queue for a customer service agent based on the customer data;
- prompt the customer service agent to play the at least one audio file using a Customer Engagement Center (CEC) desktop; and connect the customer service agent to the telephone call.

18. The medium of claim 17, wherein the medium is programmed with computer readable code that upon execution by a processor causes the processor to transmit at least one preselected audible prompt from the IVR unit to a telephone during the telephone call, receive at least one customer voice command in response to the at least one preselected audible prompt, and transform the at least one customer voice command into the at least one audio file.

19. The medium of claim 17, wherein the medium is programmed with computer readable code that upon execution by a processor causes the processor to save the at least one audio file and the customer data to an audio database.

20. The medium of claim 17, wherein the medium is programmed with computer readable code that upon execution by a processor causes the processor to route the telephone call to a queue for a next available customer service agent in the event the IVR unit is unable to process voice commands in the audio data or is unable to process DTMF tone commands.

21. The medium of claim 17, wherein the medium is programmed with computer readable code that upon execution by a processor causes the processor to prompt the customer service agent to review at least one additional data previously saved.

\* \* \* \* \*